(12) United States Patent
Knecht et al.

(10) Patent No.: US 7,013,920 B2
(45) Date of Patent: Mar. 21, 2006

(54) VALVE, ESPECIALLY PROPORTIONAL SOLENOID VALVE

(75) Inventors: Andreas Knecht, Kusterdingen (DE); Ulf Polzin, Leinfelden-Echterdingen (DE)

(73) Assignee: Hydraulik-Ring GmbH, Marktheidenfeld (DE)

( * ) Notice: Subject to any disclaimer, the term of this patent is extended or adjusted under 35 U.S.C. 154(b) by 0 days.

(21) Appl. No.: 10/708,334

(22) Filed: Feb. 25, 2004

(65) Prior Publication Data

US 2004/0216788 A1  Nov. 4, 2004

(30) Foreign Application Priority Data

Feb. 26, 2003 (DE) ............... 103 08 074

(51) Int. Cl.
*F15B 13/044* (2006.01)
(52) U.S. Cl. ............... 137/625.65; 137/454.2
(58) Field of Classification Search ........... 137/454.2, 137/625.65
See application file for complete search history.

(56) References Cited

U.S. PATENT DOCUMENTS

| 2,893,428 A | * | 7/1959 | Collins ............... 137/625.65 |
| 4,011,887 A | * | 3/1977 | Raymond ............... 137/884 |
| 4,548,383 A |   | 10/1985 | Wolfges ............... 251/129 |
| 4,723,576 A | * | 2/1988 | Raymond ............... 137/884 |
| 5,191,827 A |   | 3/1993 | Kervagoret ............... 91/433 |
| 5,651,387 A | * | 7/1997 | Thor ............... 137/625.65 |
| 6,223,763 B1 |   | 5/2001 | Meyer et al. ............... 137/118.01 |
| 6,289,921 B1 |   | 9/2001 | Neuhaus et al. ............... 137/454.5 |
| 6,344,783 B1 |   | 2/2002 | Neuhaus et al. ............... 335/278 |
| 6,453,947 B1 | * | 9/2002 | Inoue et al. ............... 137/625.65 |
| 2001/0009164 A1 |   | 7/2001 | Motoki et al. ............... 137/625.65 |

* cited by examiner

*Primary Examiner*—John Rivell
(74) *Attorney, Agent, or Firm*—Gudrun E. Huckett

(57) ABSTRACT

A valve has a solenoid part and a valve part connected to the solenoid part. The valve part has a housing provided with connecting bores for a pressure medium, including a pressure connector and working connectors. The valve part has a piston and the solenoid part acts on the piston to alternatingly connect the working connectors to the pressure connector. The valve part has at least one groove extending alongside the valve part. At least one of the connecting bores is positioned in the at least one groove.

12 Claims, 3 Drawing Sheets

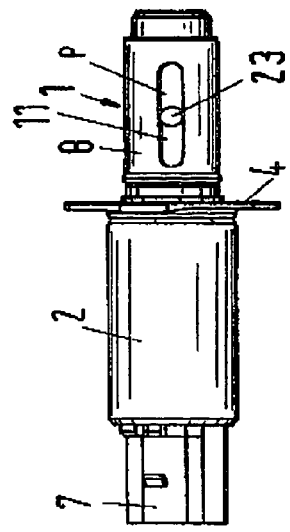
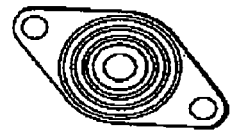
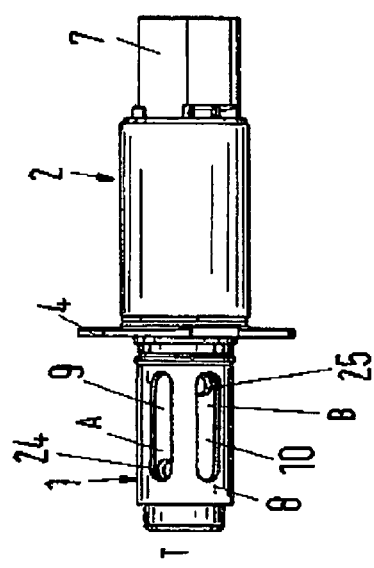
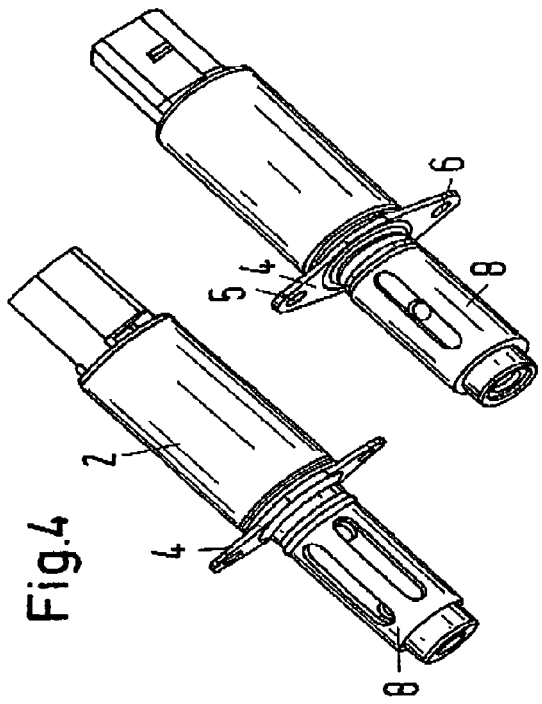

VALVE, ESPECIALLY PROPORTIONAL SOLENOID VALVE

BACKGROUND OF INVENTION

1. Field of the Invention

The invention relates to a valve, especially a proportional solenoid valve, comprising a solenoid part for actuating a piston of a valve part having a housing provided with connecting bores for a pressure medium.

2. Description of the Related Art

Such valves are used as cartridge valves inserted with their valve part into a receiving block, for example, an engine block of an internal combustion engine. The engine block is provided with oil channels via which oil is supplied to the connecting bores in the valve part. The oil channels in the receiving block must be drilled at precise angles so that they open into the matching connecting bores or annular grooves of the valve part. Moreover, the number of possible mounting positions of the valves in the receiving block are significantly restricted because of this. Therefore, very strict specifications with regard to manufacturing the oil channels are to be met. Moreover, the requirements with regard to the mounting position of the valve are significantly increased.

SUMMARY OF INVENTION

It is an object of the present invention to configure the valve of the aforementioned kind such that in a constructively simple way proper supply and proper return of the pressure medium to and from the valve part via the oil channels of the receiving block are ensured.

In accordance with the present invention, this is achieved in that at least one of the connecting bores is positioned in a groove that extends alongside the valve.

In the valve according to the invention, the connecting bore is located in a groove that extends alongside the valve. In this way, the oil channels in the receiving block must be arranged only such that they open into the groove. It is therefore no longer required to manufacture the oil channels such that they reach precisely the connecting bore. In this way, precise positioning of the oil channels allows greater tolerances. The oil flows from the respective oil channel first into the groove in which the oil then reliably flows into the connecting bore. Because of the configuration according to the invention, mounting of the valve on the receiving block is facilitated.

The groove can advantageously extend in the axial direction of the valve. However, it is also possible that the groove extends in the circumferential direction of the valve at a slant, i.e., it is inclined or has a gradient.

Expediently, for each connecting bore a separate groove is provided. These grooves are distributed about the circumference of the valve part.

Advantageously, the diameter of the connecting bore corresponds to the width of the groove. In this way, in the area of the edge of the connecting bore there is no dead space where dirt contained in the oil could collect.

Advantageously, the valve is a cartridge valve of the type used preferably in the automotive industry.

In one embodiment, the groove is provided within the valve housing.

In another embodiment, the groove is arranged in a sleeve (bushing) that is arranged on the valve part. This sleeve in this case forms a distributor sleeve that can also be pushed onto already existing valves. It is therefore possible to retrofit existing valves.

In this case, at the bottom of the groove of the sleeve a bore is provided that communicates with an annular groove of a valve member of the valve part.

BRIEF DESCRIPTION OF DRAWINGS

FIG. 2 shows the valve according to the invention in a side view onto the working connectors A, B, and T.

FIG. 2a shows an end view of the valve of FIG. 2 looking onto the T connector.

FIG. 3 shows the valve according to the invention in a side view onto the pressure connector P.

FIG. 4 is a perspective view of the valve according to the invention.

FIG. 5 another perspective view of the valve according to the invention rotated relative to the view of FIG. 4.

DETAILED DESCRIPTION

Figure 1:
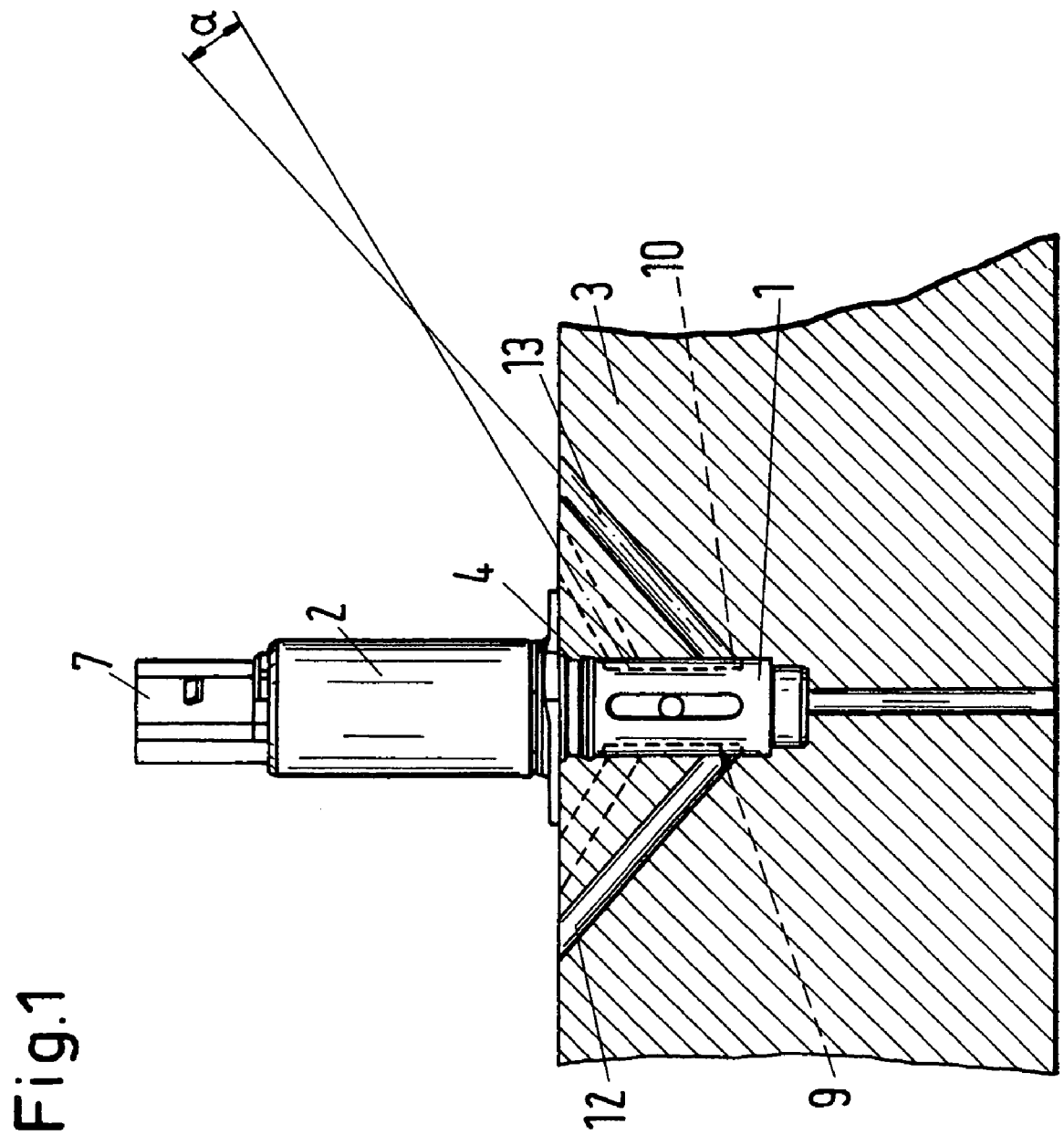
FIG. 1 shows a valve according to the invention in the mounted state.

In the illustrated embodiment, the valve is a proportional solenoid valve comprising a valve part 1 and a solenoid part 2. The valve part 1, as is known in the art, comprises a piston (not illustrated) that can be moved by means of a plunger (not illustrated) of the solenoid part 2 against a counter force. In this way, the working connectors A and B can be brought alternatingly into communication with the pressure connector P. The valve is inserted with its valve part 1 into a receiving block 3 (FIG. 1); the receiving block can be an engine block of an internal combustion engine. At the transition from the valve part 1 into the solenoid part 2, the valve is provided with a mounting flange 4 that projects radially past the valve part 1 and/or the solenoid part 2 and rests against the receiving block 3 in the mounted position. The mounting flange 4 has openings 5, 6 (FIG. 5) for screws with which the valve can be fastened on the receiving block 3. At the end of the solenoid part 2 facing away from the valve part 1, an electrical connector 7 is provided.

The valve part 1 has a valve housing 8 which is provided in the illustrated embodiment with axially extending oil guiding grooves 9 to 11. At the bottom of the oil guiding grooves 9 to 11, a bore (23 to 25) is provided, respectively. By means of these grooves 9 to 11 and bores 23 to 25, the hydraulic oil is supplied to the connecting bores A, B, and P. The connecting bores A and B form working connectors, the connecting bore P the pressure connector, and the connecting bore T the tank connector.

The receiving block 3 is provided with oil channels. FIG. 1 shows the oil channels 12 and 13. In the valves according to the prior art, these oil channels must be aligned exactly with the connecting bores or annular grooves in the valve part 1 when the valve is in the mounted position. This requires a very precise manufacture of the oil channels in the receiving block 3 as well as of the arrangement of the connecting bores in the valve part 1. In the valve of the present invention, this precise positional alignment is no longer necessary. When mounting the valve, it must only be ensured that the oil channels 12, 13 of the receiving block 3 open into the corresponding oil guiding grooves 9 to 11 of the valve part 1. Within the oil guiding grooves the oil can flow to the corresponding connecting bores in any case. On the other hand, the oil reliably returns from the valve part 1 into the respective oil channels 12, 13.

As a result of the axial extension of the oil guiding grooves 9 to 11, the oil channels 12, 13 in the receiving block 3 can extend at different angles or slants without this impairing the reliable supply of the oil. The solid lines indicate the oil channels 12, 13 in an extreme slanted position in which they open into the lower end of the oil guiding grooves 9, 10. By means of the dashed lines, the other extreme slanted position of these oil channels is illustrated in which they open into the upper end of the oil guiding groove 9, 10, respectively. Accordingly, the oil channels 12, 13 in the receiving block 3 can be positioned at different slants varying within the indicated angle $\alpha$ without this impairing the supply or return of the oil.

Because of the oil guiding grooves 9 to 11, a high positional precision or accuracy of the oil channels 12, 13 to be drilled into the receiving block 3 is no longer required. The slant of the oil channels 12, 13 can vary by the angle $\alpha$. Because of the oil guiding grooves 9 to 11, the variability of the mounting position of the valve in the receiving block 3 is significantly increased. Moreover, the oil guiding grooves 9 to 11 widen the tolerance range for the angular position of the oil channels 12, 13.

In the illustrated embodiment, the different oil guiding grooves 9 to 11 extend axially, respectively. However, it is possible easily to provide the oil guiding grooves 9 to 11 also slanted at an angle relative to the valve housing 8. In this case, a high positional precision of the oil channels 12, 13 in the receiving block 3 is also not required.

Figure 8:
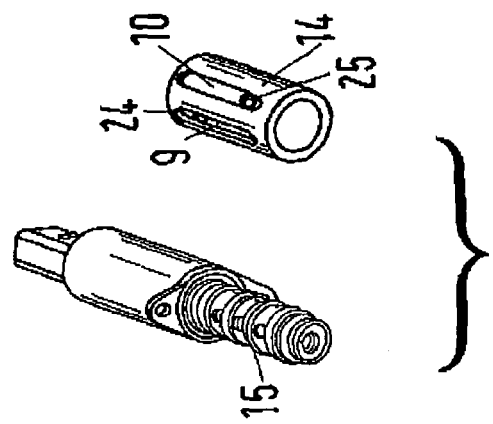
FIG. 8 is a perspective illustration of the valve according to FIG. 6 with a bushing (sleeve).
Figure 6:
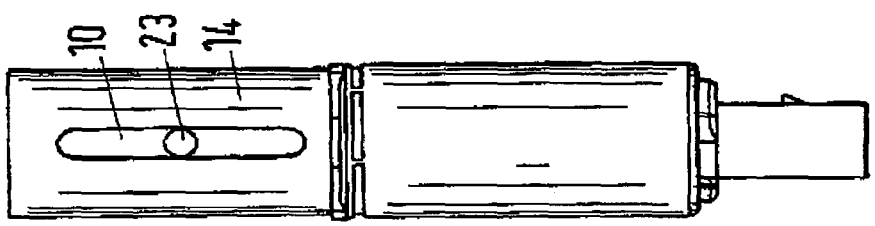
FIG. 6 shows a second embodiment of the valve according to the invention in a side view.
Figure 7:
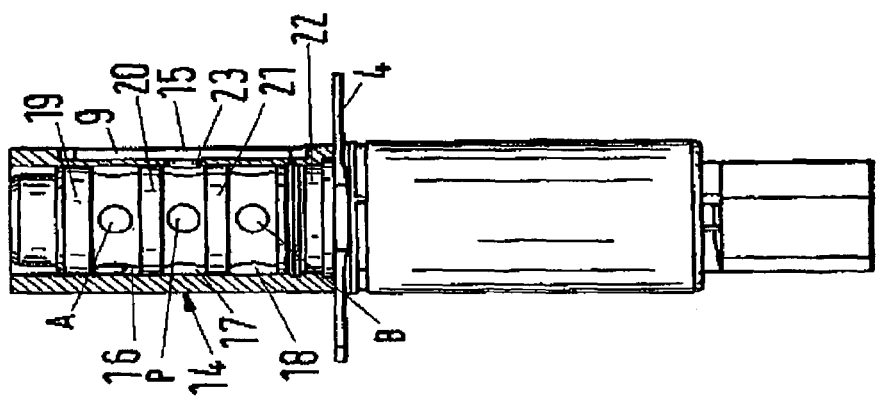
FIG. 7 shows the valve according to FIG. 6 partially in axial section.

FIGS. 6 through 8 show an embodiment of a valve in which the oil guiding grooves 9 to 11 are provided in a bushing (sleeve) 14 that is pushed onto a valve member 15. The valve member 15 has annular grooves 16 to 18 that are delimited by annular webs 19 to 22. The different connectors A, B, P of the valve open into the annual grooves 16 to 18. The webs 19 to 22 are positioned on the inner wall of the sleeve or bushing 14 so that the oil cannot flow across the annular webs into the neighboring oil grooves 16–18.

At the bottom of the oil guiding grooves 9 to 11, a bore 23 to 25 is provided, respectively, through which the oil can reach the respective annular groove 16–18. The bores 23 to 25 of neighboring oil guiding grooves 9 to 11 are axially staggered relative to one another.

The bushing 14 is pushed onto the valve member 15 to such an extent that it rests with its end face against the fastening flange 4. The bushing 14 forms a distributor sleeve with which valves can be retrofitted in order to also obtain the advantage of a variable mounting position of the valve in the receiving block 3. In deviation from the illustrated embodiment, the oil guiding grooves 9 to 11 in the bushing 14 can be positioned inclined at an angle In other respects, the valve according to FIGS. 6 to 8 is identical to the preceding embodiment.

While specific embodiments of the invention have been shown and described in detail to illustrate the inventive principles, it will be understood that the invention may be embodied otherwise without departing from such principles.

What is claimed is:

1. A valve comprising:
a solenoid part;
a valve part connected to the solenoid part;
wherein the valve part has a housing provided with connecting bores for a pressure medium;
wherein the valve part comprises a piston and wherein the solenoid part acts on the piston to alternatingly connect the connecting bores to one another;
wherein the valve part has at least one groove extending alongside the valve part;
wherein at least one of the connecting bores is positioned in the at least one groove;
wherein the valve part comprises a sleeve and the at least one groove is provided in the sleeve;
wherein the valve part comprises a valve member having an annular groove, wherein the sleeve is pushed onto the valve member and surrounds the valve member, wherein at the bottom of the at least one groove a bore is provided that communicates with the annular groove of the valve member of the valve part.

2. The valve according to claim 1, wherein the at least one groove extends in an axial direction of the valve.

3. The valve according to claim 1, wherein the connecting bores each are located in a separate one of the at feast one groove.

4. The valve according to claim 3, wherein a diameter of the connecting bores matches a width of the separate one of the at least one groove, respectively.

5. The valve according to claim 1, wherein a diameter of the connecting bores matches a width of the at least one groove.

6. The valve according to claim 1, wherein the valve is a cartridge valve.

7. The valve according to claim 1, wherein the valve is a proportional solenoid valve.

8. A valve comprising:
a solenoid part;
a valve part connected to the solenoid part;
wherein the valve part has a housing provided with connecting bores for a pressure medium;
wherein the valve part comprises a piston and wherein the solenoid part acts on the piston to alternatingly connect the connecting bores to one another;
wherein the valve part has several grooves that extend axially within the valve part and are distributed at a spacing from one another in a circumferential direction of the valve part; and
wherein the connecting bores each are positioned in one of the several grooves, respectively.

9. The valve according to claim 8, wherein the several grooves are provided in the housing of the valve part.

10. The valve according to claim 8, wherein a diameter of the connecting bores matches a width of the several grooves, respectively.

11. The valve according to claim 8, wherein the valve is a cartridge valve.

12. The valve according to claim 8, wherein the valve is a proportional solenoid valve.

* * * * *